No. 728,104. Patented May 12, 1903.

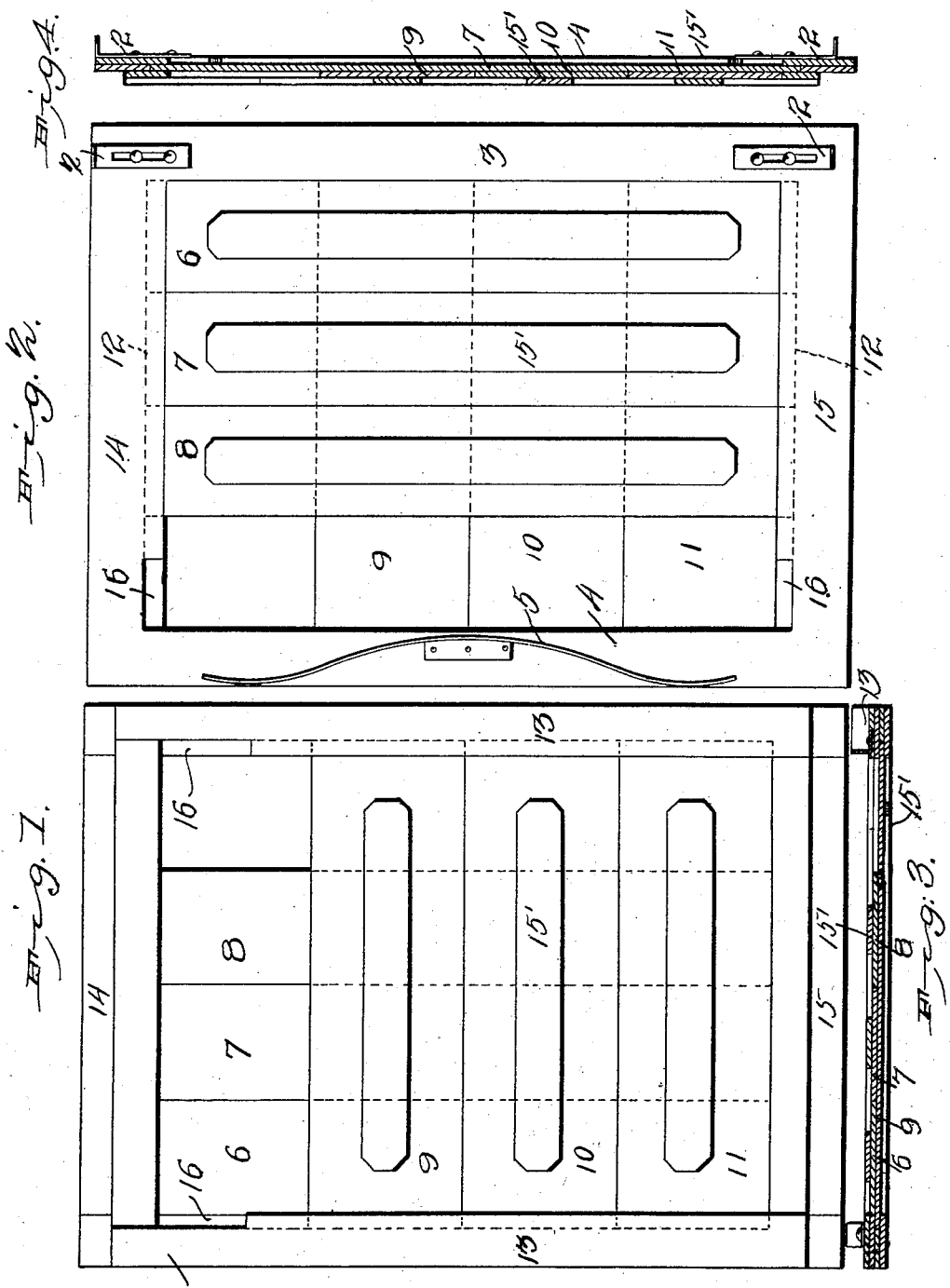

UNITED STATES PATENT OFFICE.

WRIGHTSMAN D. HIMES, OF INDIANAPOLIS, INDIANA, ASSIGNOR OF ONE-HALF TO HENRY E. KATTMAN, OF INDIANAPOLIS, INDIANA.

MULTIPLYING ATTACHMENT FOR PHOTOGRAPHIC CAMERAS.

SPECIFICATION forming part of Letters Patent No. 728,104, dated May 12, 1903.

Application filed July 26, 1902. Serial No. 117,133. (No model.)

*To all whom it may concern:*

Be it known that I, WRIGHTSMAN D. HIMES, a citizen of the United States, residing at Indianapolis, in the county of Marion and State of Indiana, have invented a new and useful Multiplying Attachment for Photographic Cameras, of which the following is a specification.

This invention relates to a multiplying attachment for photographic cameras.

The object of the invention is in a ready, simple, thoroughly feasible, and practical manner to produce by successive exposures a plurality of adjacent negatives on a single plate, from which a picture may be developed having the appearance of being the result of a single exposure.

With these and other objects in view, as will appear as the nature of the invention is better understood, the same consists in the novel construction and combination of parts of an attachment for photographic cameras, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof; and in these drawings—

Figure 1 is a view in elevation taken from the front of the attachment. Fig. 2 is a similar view taken from the rear. Fig. 3 is a horizontal sectional view taken on the line 3 3, Fig. 1. Fig. 4 is a vertical sectional view taken on the line 4 4, Fig. 2.

Referring to the drawings, 1 designates the frame of the attachment, which may be made of any desired size, according to the camera with which it is to be used, and may be constructed from stamped sheet metal, wood, or hard rubber. The rear side of the frame is provided with two adjustable stops or shoulders 2, secured to the inner surface of one of the side pieces 3 of the frame, the other side piece 4 having a bow-shaped spring 5 secured to it, the said shoulders being adapted when the frame is positioned in front of the ground-glass frame of the camera to bear, respectively, against the upper and lower edges of the walls of the camera-opening adjacent to the ground-glass frame and the spring to bear against one of the side walls of the said opening, and by this arrangement the attachment may be readily secured in position or removed when desired.

Associated with the frame 1 are a plurality of screens—in this instance, six—three, 6, 7, and 8, being arranged vertically and the other three, 9, 10, and 11, arranged horizontally, the ends of both sets of screens being adapted to work in guides 12 and 13, formed, respectively, in the two sides 3 and 4 of the frame and the two ends 14 and 15. The screens may be made of any suitable material, such as pressed cardboard or hard rubber, and have their edges beveled in order to overlap slightly, and thus preclude entrance of light. The back of each screen is provided with a strip or plate 15, of less length and width than the screen and operating longitudinally to reinforce the screen and also to provide a fingerhold to facilitate movement of the screens as requisite. One end of each of the guides is cut away for a portion of its length at 16 in order to permit removal of one or more of the screens when it is desired to increase the size of the negatives or reduce the number of exposures thereon. Thus, for instance, if screen 8 be removed only eight exposures can be made on a single plate, and if screens 8 and 9 be removed only four exposures can be secured, while if screens 6, 7, 8, and 9 be removed but two exposures can be had. When all six screens are in position, sixteen exposures can be had on one plate and will be secured as follows: By reference to Fig. 1 it will be seen that there is an open space at the upper right-hand corner of the frame, and this will be for the first exposure. After the focus is obtained the plate-holder will be inserted as in the ordinary operation of the camera and an exposure is secured. The plate-holder is then removed and screen 9 moved up, this presenting a second opening for a second picture, and the operation is repeated until sixteen exposures have been secured.

To adjust the attachment to change the size of the opening requires but a small amount of labor and may be quickly accomplished. As the screens are adapted to bear squarely against each other when shifted, the area of plate presented to receive the negatives will be exactly the same in each place, so that when the picture has been taken it will have the appearance of having been the result of a single exposure. This device may be used for taking photographs of different persons or things upon a single plate, or one person may have his picture taken in different positions. Owing to the simplicity of its construction, it is adapted for use by amateurs, and being made with a view to service will not be likely to get out of repair from long-continued use; but should one or more of the screens be damaged or broken repair may readily and cheaply be effected.

Having thus fully described my invention, what I claim as new, and desire to secure by Letters Patent, is—

1. A multiplying attachment for cameras, comprising a frame provided in its sides and ends with guides, and a plurality of vertically and laterally adjustable screens having their ends mounted to slide within the guides.

2. A multiplying attachment for cameras, comprising a frame provided in its sides and ends with guides, and a plurality of vertically and laterally adjustable screens having their ends mounted to slide within the guides, a length of one end portion of each guide being cut away to permit removal of a slide or slides.

3. A multiplying attachment for cameras, comprising a frame provided in its sides and ends with guides, laterally and vertically adjustable screens having their ends mounted to slide within the guides, adjustable stops or shoulders carried by one of the side members of the frame, and adapted for engagement with the walls of the camera-opening, and a bow-spring carried by the other side member and adapted for engagement with the walls of the camera-opening.

In testimony that I claim the foregoing as my own I have hereto affixed my signature in the presence of two witnesses.

WRIGHTSMAN D. HIMES.

Witnesses:
SAMUEL H. BRUBAKER,
HARRY KISER.